United States Patent
Parkinson (10) Patent No.: US 7,698,309 B2
(45) Date of Patent: Apr. 13, 2010

(54) ADVANCED FINE-GRAINED ADMINISTRATION OF RECOVERING TRANSACTIONS

(75) Inventor: Paul Parkinson, Wenonah, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 543 days.

(21) Appl. No.: 11/204,151

(22) Filed: Aug. 16, 2005

(65) Prior Publication Data

US 2007/0043784 A1 Feb. 22, 2007

(51) Int. Cl.
*G06F 12/00* (2006.01)
(52) U.S. Cl. .................. 707/202; 707/203; 707/204
(58) Field of Classification Search .............. 707/202, 707/201, 203, 204, 200; 714/2, 5; 711/111, 711/112, 113
See application file for complete search history.

(56) References Cited

U.S. PATENT DOCUMENTS

| | | | |
|---|---|---|---|
| 5,774,717 A * | 6/1998 | Porcaro ................. | 707/202 |
| 6,668,304 B1 * | 12/2003 | Satran et al. ............ | 711/112 |
| 2006/0235854 A1 * | 10/2006 | Luo ....................... | 707/10 |
| 2007/0088970 A1 * | 4/2007 | Buxton et al. ........... | 714/2 |

* cited by examiner

*Primary Examiner*—Hosain T Alam
*Assistant Examiner*—Amy Ng
(74) *Attorney, Agent, or Firm*—Hanify & King, PC (57) ABSTRACT

A method, system, and computer program product provides advanced and fine-grained transaction administration features, along with interoperability between transactional software architectures and business entities. A method of administering recovering transactions comprises the steps of operating a transaction processing system, and attempting recovery of a plurality of transactions in the transaction processing system after a failure of the transaction processing system by determining a recovery action to be taken for each of the plurality of transactions individually.

16 Claims, 9 Drawing Sheets

ADVANCED FINE-GRAINED ADMINISTRATION OF RECOVERING TRANSACTIONS

BACKGROUND OF THE INVENTION

1. Field of the Invention

The present invention relates to a system, method, and computer program product for providing advanced and fine-grained transaction administration features, along with interoperability between transactional software architectures and business entities.

2. Description of the Related Art

Distributed systems have become a standard architecture for the implementation of databases, Web servers, application servers, etc. Accesses that are made to the data stored in such systems are known as transactions. Transactions that modify data stored in server systems present certain challenges in the operations of a distributed server system. Many commercial transaction-processing systems use the two-phase commit protocol, which requires a series of messages to be exchanged between a transaction manager or coordinator and the resource managers that are defined by a voting process.

Regardless of the claimed reliability of a system, failure of the system is always a possibility. For the transaction processing to function properly in the face of a failure, the coordinator must log information to a non-volatile store (typically disk) that can be used to recover a coordinator failure. A recovering transaction is one that is reconstructed as a result of a previous failure in the processing of a transaction. In conventional systems, there is little administrative functionality for recovering transactions in the field and the little there is can only be applied at a global level to all recovering transactions. In particular, conventional systems provide little capability to monitor and administratively act on recovering transactions as well as receive notifications for related events.

Currently the only existing recovery feature of any sort is that provided by the BEA® WEBLOGIC® system, which allows for the complete abandonment of recovery after a given period of time. This period of time applies to all recovering transactions and defaults to 24 hours, which is inflexible, inappropriate and even dangerous in some situations.

As administrators grow more knowledgeable, a need arises for advanced and fine-grained transaction administration features, along with the need for interoperability between transactional software architectures and business entities.

SUMMARY OF THE INVENTION

The present invention provides advanced and fine-grained transaction administration features, along with interoperability between transactional software architectures and business entities.

In one embodiment of the present invention, a method of administering recovering transactions comprises the steps of operating a transaction processing system, and attempting recovery of a plurality of transactions in the transaction processing system after a failure of the transaction processing system by determining a recovery action to be taken for each of the plurality of transactions individually.

In one aspect of the present invention, the attempting step comprises the steps of for each of the plurality of transactions determining a state of the transaction, and determining an administrative action to be taken with the transaction based on the state of the transaction and on resources enlisted in the transaction. The step of determining an administrative action comprises the steps of rolling back the transaction, if the state of the transaction is active and the resources enlisted in the transaction are of a certain state, if the state of the transaction is in-doubt and the resources enlisted in the transaction are of a certain state, and abandoning the transaction, if the state of the transaction is recovering and the resources enlisted in the transaction are of a certain state.

In one aspect of the present invention, an active transaction is a transaction which has not yet entered a preparing phase of a commit process and the limit includes the transaction taking longer than a predefined response time, relative to desired system response time, or the transaction using resources greater than a predefined system resource allocation. An in-doubt transaction is a transaction which is in a preparing phase of a two-phase commit process, and which has not yet entered a commit and the limit includes the transaction taking longer than a predefined response time, relative to desired system response time, or the transaction using resources greater than a predefined system resource allocation. A recovering transaction is a transaction which has suffered an error or failure, and which the system is attempting to repair and complete and the limit includes the transaction taking longer than a predefined response time, relative to desired system response time, or the transaction using resources greater than a predefined system resource allocation.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENTS

Figure 1:
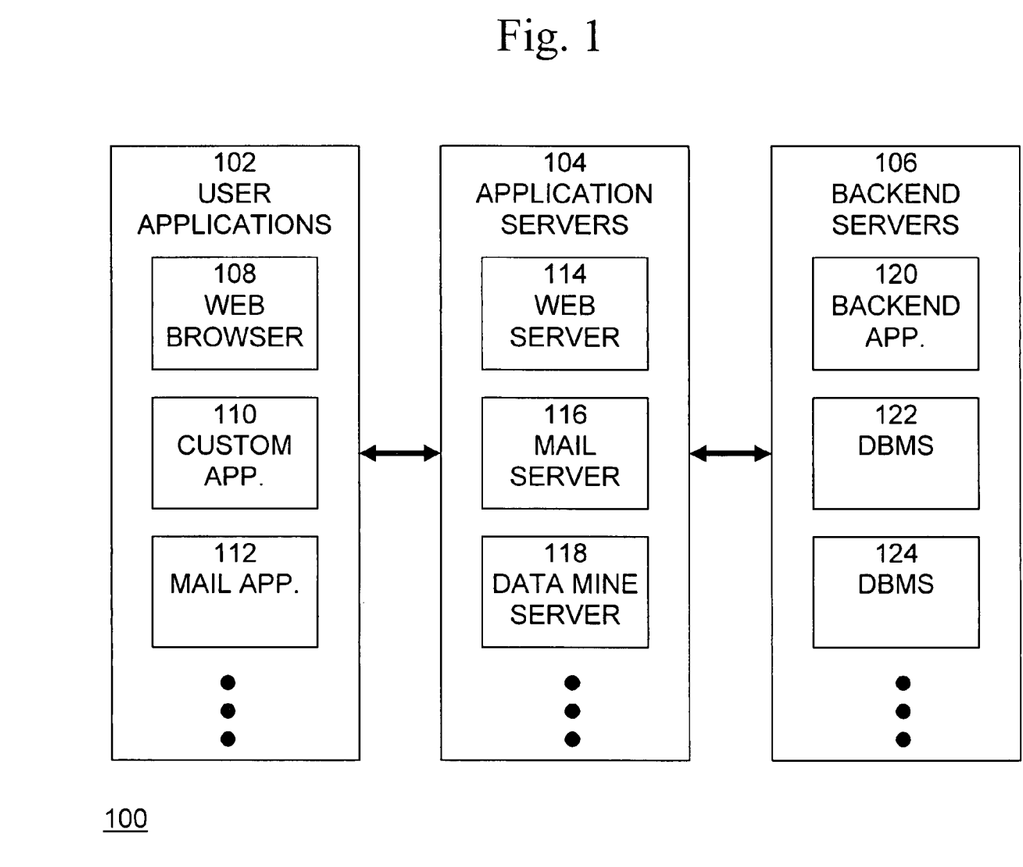
FIG. 1 is an exemplary block diagram of a system architecture, in which the present invention may be implemented.

An exemplary system architecture 100, in which the present invention may be implemented, is shown in FIG. 1. System 100 includes user applications 102, application servers 104, and backend servers 106. User applications 102 include a plurality of applications that are operated by or interface with a user, such as web browser 108, custom application 110, and mail application 112. Application servers 104 include a plurality of servers that handle application operations between user applications 102 and backend servers 106, such as web server 114, mail server 116, and data mining server 118. Application servers are typically used for complex transaction-based applications. To support high-end needs, an application server should have built-in redundancy, monitors for high-availability, high-performance distributed application services and support for complex database access. Examples of types of servers that may be included in application servers 104 include:

Audio/Video Servers: Audio/Video servers bring multimedia capabilities to Web sites by enabling them to broadcast streaming multimedia content.

Chat Servers: Chat servers enable a large number of users to exchange information in an environment similar to Internet newsgroups that offer real-time discussion capabilities.

Fax Servers: A fax server is an ideal solution for organizations looking to reduce incoming and outgoing telephone resources but that need to fax actual documents.

FTP Servers: One of the oldest of the Internet services, File Transfer Protocol makes it possible to move one or more files securely between computers while providing file security and organization as well as transfer control.

Groupware Servers: A groupware server is software designed to enable users to collaborate, regardless of location, via the Internet or a corporate intranet and to work together in a virtual atmosphere.

IRC Servers: An option for those seeking real-time discussion capabilities, Internet Relay Chat consists of various separate networks (or "nets") of servers that allow users to connect to each other via an IRC network.

List Servers: List servers offer a way to better manage mailing lists, whether they be interactive discussions open to the public or one-way lists that deliver announcements, newsletters, or advertising.

Mail Servers: Almost as ubiquitous and crucial as Web servers, mail servers move and store mail over corporate networks (via LANs and WANs) and across the Internet.

News Servers: News servers act as a distribution and delivery source for the thousands of public news groups currently accessible over the USENET news network.

Proxy Servers: Proxy servers sit between a client program (typically a Web browser) and an external server (typically another server on the Web) to filter requests, improve performance, and share connections.

Telnet Servers: A Telnet server enables users to log on to a host computer and perform tasks as if they're working on the remote computer itself.

Web Servers: At its core, a Web server serves static content to a Web browser by loading a file from a disk and serving it across the network to a user's Web browser. This entire exchange is mediated by the browser and server talking to each other using HTTP.

Backend servers 106 include a plurality of servers, such as backend business application 120 and database management systems 122 and 124. Database management systems (DBMSs) are software that enables storing, modifying, and extracting information from a database. There are many different types of DBMSs, ranging from small systems that run on personal computers to huge systems that run on mainframes. Examples of database applications include:

computerized library systems
automated teller machines
flight reservation systems
computerized parts inventory systems From a technical standpoint, DBMSs can differ widely. The terms relational, network, flat, and hierarchical all refer to the way a DBMS organizes information internally. The internal organization can affect how quickly and flexibly information can be extracted.

No matter how reliable a system, no system is perfect—failures are always a possibility. For example, during a bank transfer transaction, money is credited from one account, but the second account's system crashes before the money is debited there. A recovery manager reconstructs the now recovering transaction and attempts to bring the system to a balanced and stable state according to the ACID properties of transactions.

ACID stands for Atomicity, Consistency, Isolation, and Durability. Theses properties are considered to be the key guarantees of a transaction processing system and the resource managers which participate in transactions such as a database management system, or DBMS. Without them, the integrity of the database cannot be guaranteed.

In the context of databases, a single logical operation on the data is called a transaction. This is not a logical operation such as a logical AND or logical NOT. A transfer of funds from one account to another is considered as such a transaction, for example, even though it might consist of multiple tasks (debiting one account and crediting another). The ACID properties guarantee that such transactions are processed reliably.

Atomicity refers to the ability of the DBMS to guarantee that either all of the tasks of a transaction are performed or none of them are. The transfer of funds can be completed or it can fail for a multitude of reasons, but atomicity guarantees that one account won't be debited if the other is not credited as well.

Consistency refers to the database being in a legal state when the transaction begins and when it ends. This means that a transaction can't break the rules, or integrity constraints, of the database. If an integrity constraint states that all accounts must have a positive balance, then any transaction violating this rule will be aborted.

Isolation refers to the ability of the application to make operations in a transaction appear isolated from all other operations. This means that no operation outside the transaction can ever see the data in an intermediate state; a bank manager can see the transferred funds on one account or the other, but never on both—even if he ran his query while the transfer was still being processed. More formally, isolation means the transaction history is serializable.

Durability refers to the guarantee that once the user has been notified of success, the transaction will persist, and not be undone. This means it will survive system failure, and that the database system has checked the integrity constraints and won't need to abort the transaction. Typically, all transactions are written into a log that can be played back to recreate the system to its state right before the failure. A transaction can only be deemed committed after it is safely in the log.

Another more drastic example of system failure is a fire that caused the system to crash and melt the disc, destroying all information on it. Another example of a drastic system failure is the seizure of some or all of the system hardware. These failures are irreversible in the sense that the component that failed cannot be returned to service. Thus, recovery from such failures requires the use of backed-up data.

In prior art application servers, the system will attempt recovery on all transactions that may be recovered for a period of time and then give up and abandon all such transactions entirely. The present invention provides the capability to monitor recovering transactions for information such as but not limited to:

the state they are currently
the amount of time the recovery manager has been attempting to recover a particular transaction the name and identification of the transaction
information on all participants in the transaction Based on any combination of these criteria, an administrator of the system can be notified so that proper action may be taken, or the action can be automated based on custom rules.

For example, the administrator of the system may wish to be notified immediately if a transaction related to a certain business process has failed and has been attempting to recover via rolling back for 10 minutes and involves the database in city x.

The administrator can then choose to contact the DBA of the failing database, investigate the application server logs for any other possible issues, or designate that the recovery manager should try for 20 more minutes before abandoning the transaction.

The above scenario can also be automated so that anytime this combination occurs, e.g. an email with the server log should be sent to the DBA and the recovery manager should try for 20 more minutes before abandoning the transaction.

Figure 2:
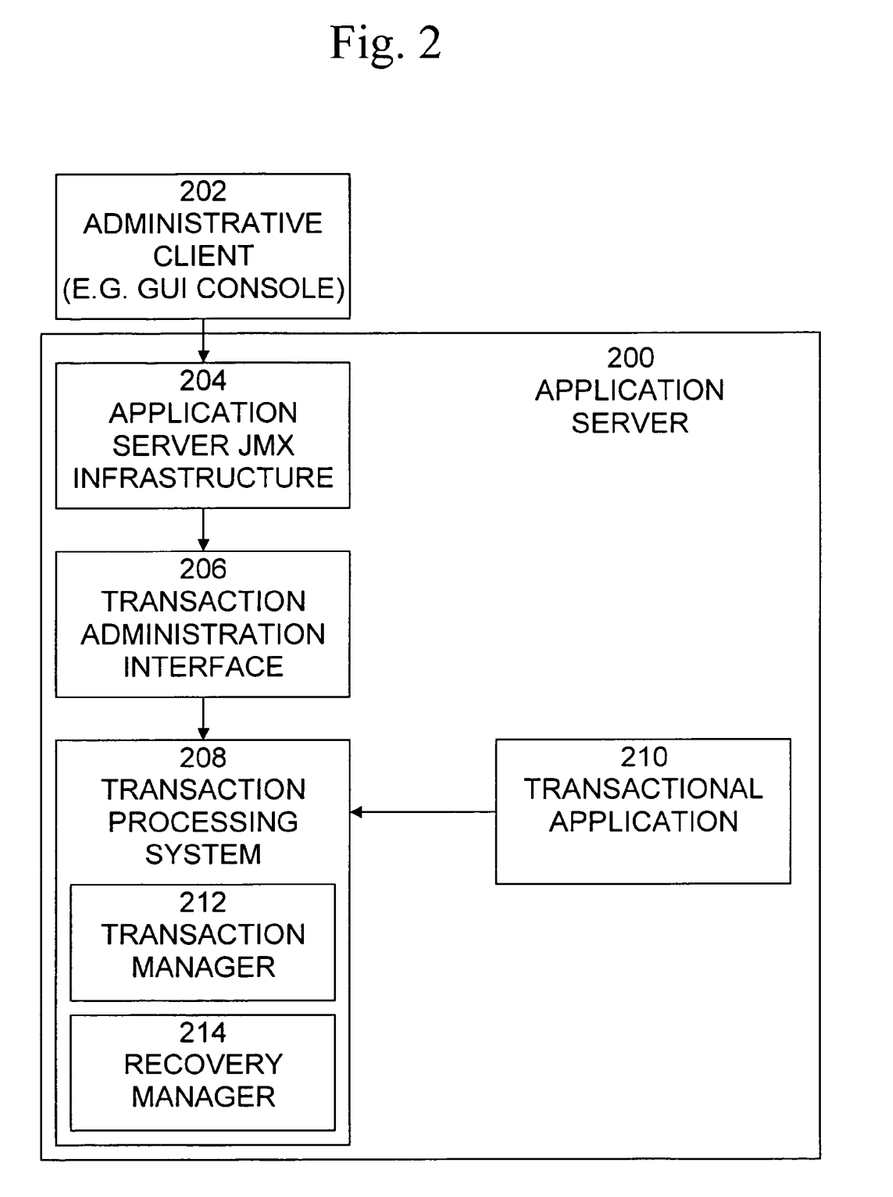
FIG. 2 is an exemplary block diagram of components involved in implementing the transaction recovery administration capability of the present invention in an application server.
Figure 5:
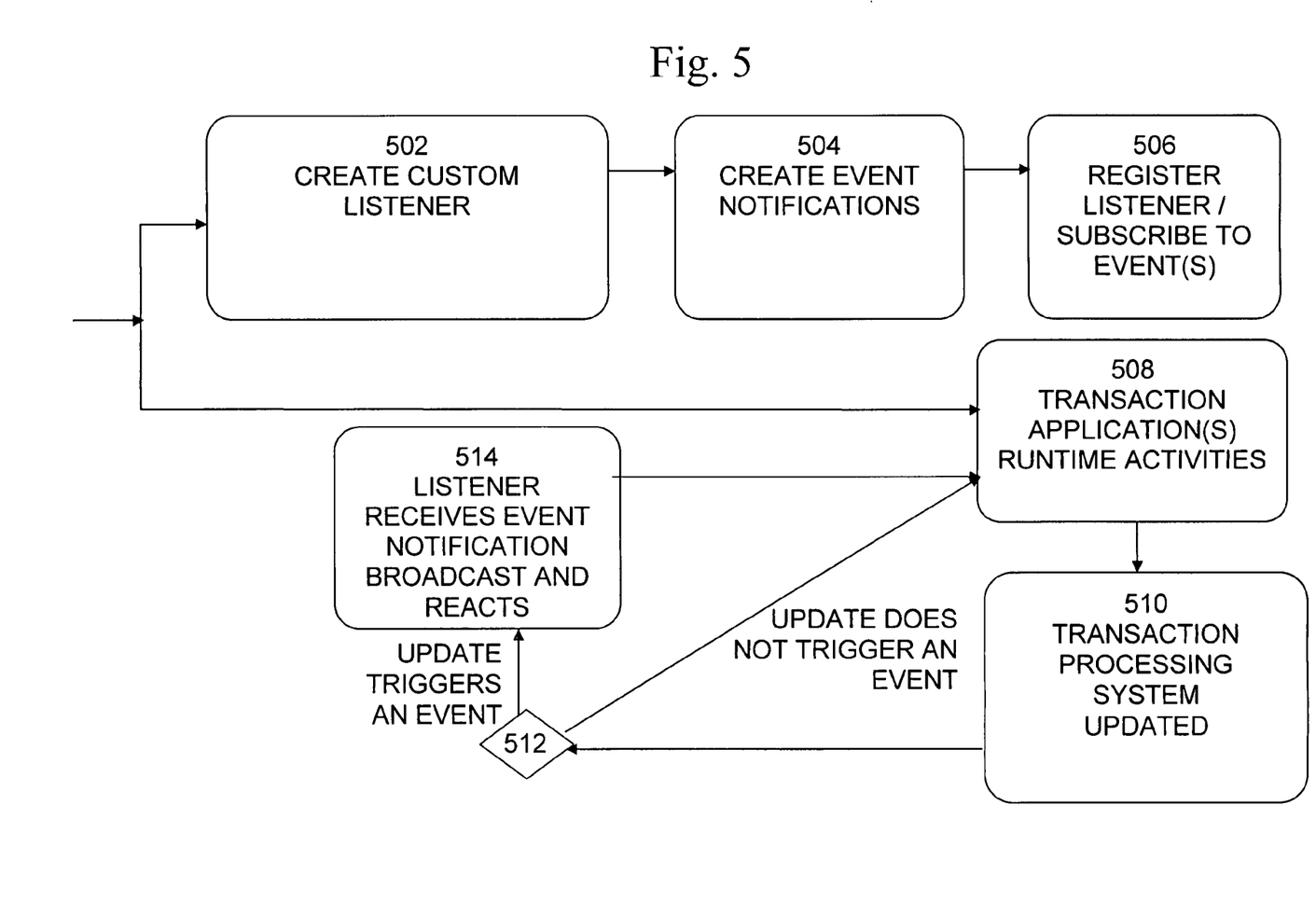
FIG. 5 is an exemplary flow diagram of a transactional application that may be processed by the present invention.

An example of the components involved in implementing the transaction recovery administration capability of the present invention in an application server 200 is shown in FIG. 2. These components include an administrative client 202, application server infrastructure 204, transaction administration interface 206, transaction processing system 208, and transactional application 210. Administrative client 202 is the front-end that the user interacts with in order to monitor and manipulate transactions, and to register listeners for custom events. These transactions are generally related to one or more business processes and/or entities, running within transaction processing system 208 of application server 200. Commonly this front-end is presented as a graphical interface, an example of which is a console as shown in FIG. 5.

Requests from administrative client 202 are sent into application server 200 via an infrastructure, such as the Application Server JMX Infrastructure 204, as defined in the J2EE Enterprise Edition Management Specification JSR-77.

Transaction Administration Interface 206 is the actual embodiment of the advanced fine-grained administration of the present invention. Interface 206 provides the capability to interact with Transaction Processing System 208 and to send custom events to listeners registered by Administrative Client 202. This functionality is provided, for example, through an extension of the JMX JTAResource Mbean, an example of which is shown in FIG. 3.

Transaction Processing System 208 includes transaction manager 212, which is responsible for handling runtime processing of transactions. Transaction Processing System 208 includes recovery manager 214, which is responsible for completing any transactions that may have been unexpectedly interrupted or failed (due to hardware crash or network failure, for example) thereby bringing the transactional participant resources to a stable state and maintaining the ACID properties of the transaction.

Transactional Application 210, also referred to as an Application Program, is the runtime routine (for example, a business process whereby funds are transferred from one bank to another) that requires the use of Transaction Processing System 208 in order to maintain the ACID properties of the resources used within the scope of the transaction it has demarcated.

Figure 3:
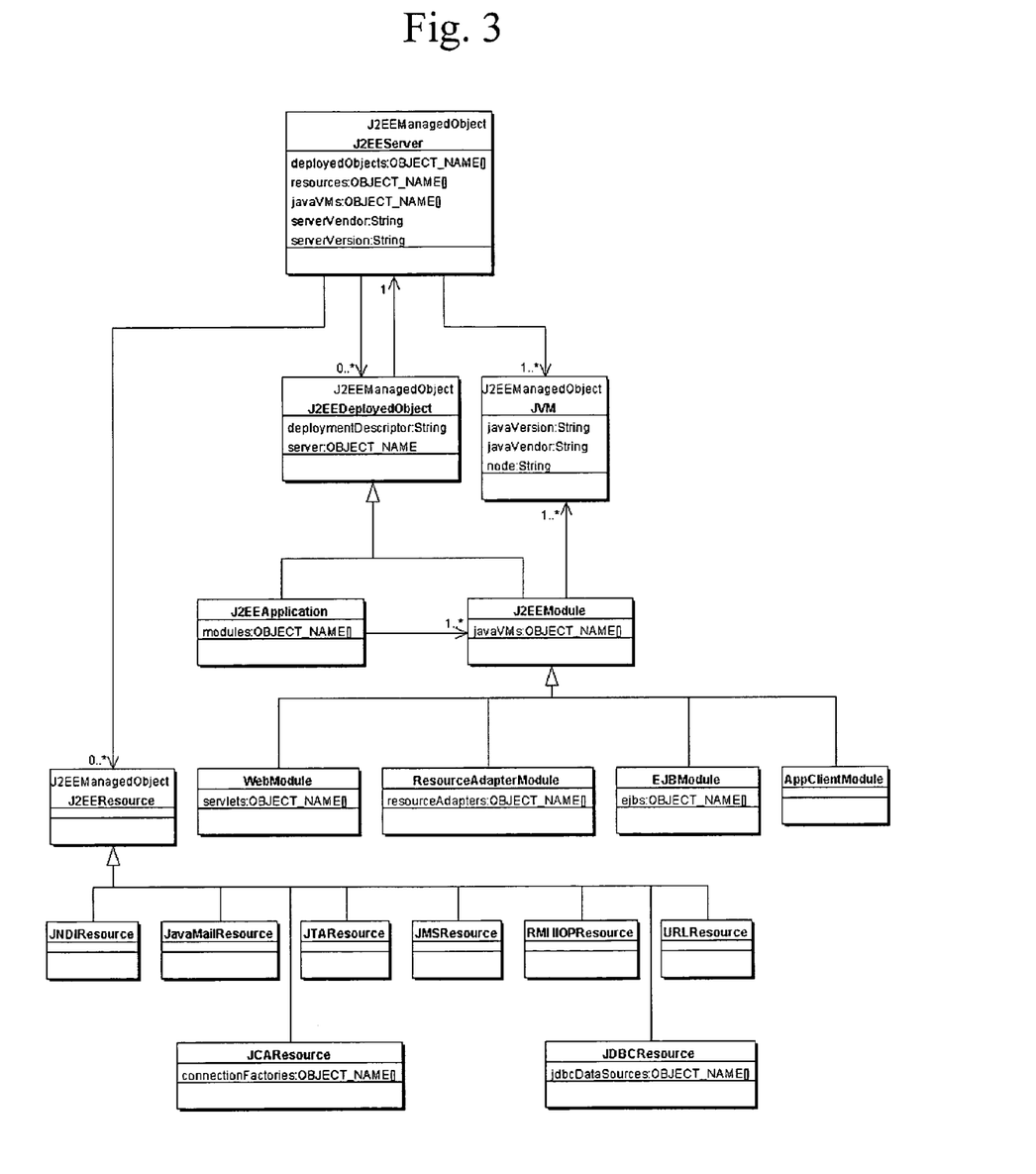
FIG. 3 is an exemplary diagram of an extension of the JMX JTAResource Mbean.

An example of an extension of the JMX JTAResource Mbean 300, is shown in FIG. 3.

The solution provides the ability to monitor and administratively act on recovering transactions as well as receive notifications for related events.

A recovering transaction is one that is reconstructed as a result of a previous failure in the processing of a transaction.

Failures are always at very least a remote possibility in even the most secure of systems claiming the five nine's (i.e. 99.999%) of reliability and arguably inevitable and in the case of transactions can include resource manager crashes, transaction manager crashes, etc. resulting for any number of reasons.

Figure 4:
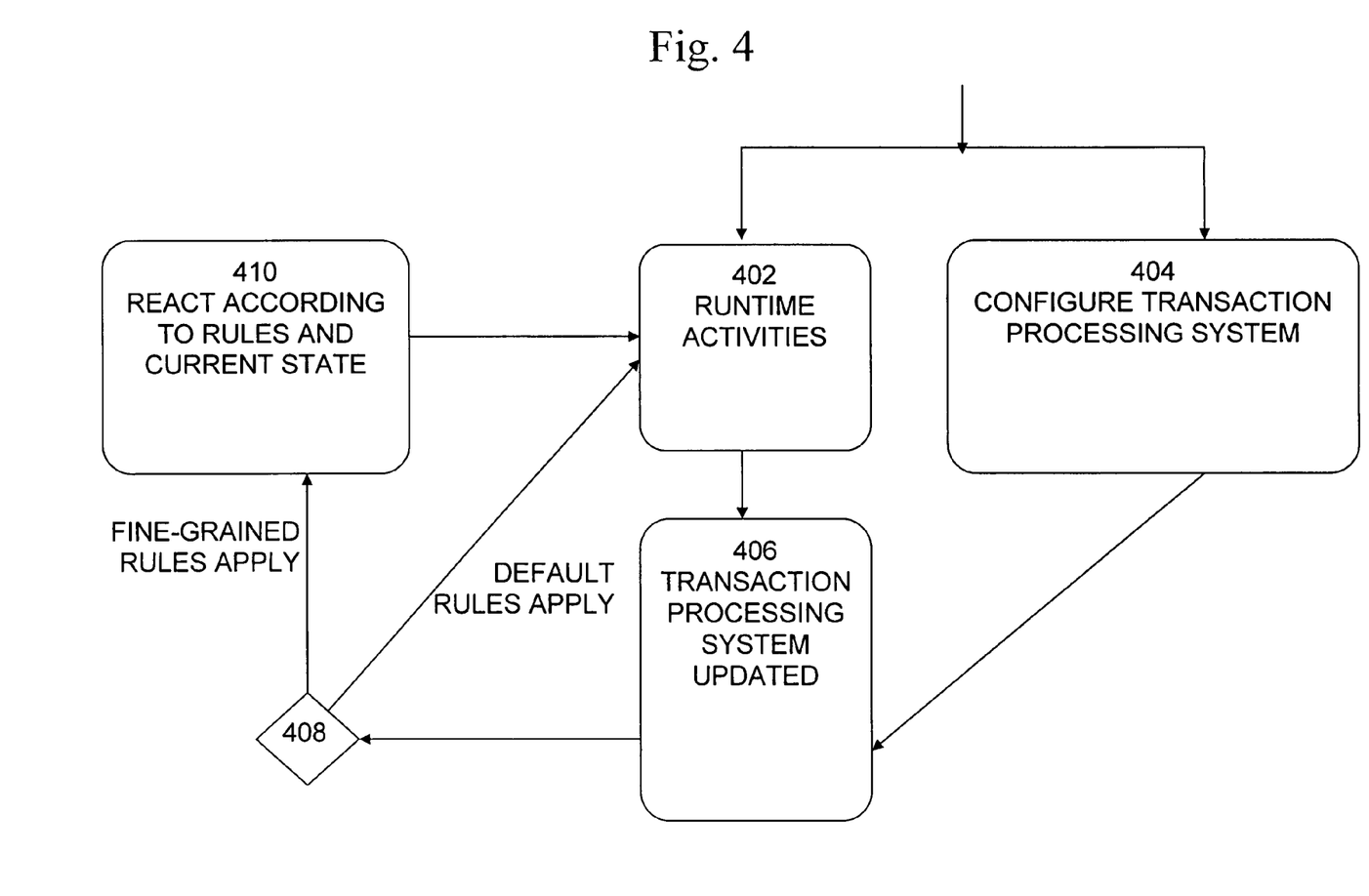
FIG. 4 is an exemplary flow diagram of a transactional application that may be processed by the present invention.

An example of Transactional Application 210, shown in FIG. 2, is shown in FIG. 4. In FIG. 4, the example shown relates to a bank funds transfer transaction. During the bank transfer transaction, money is credited from one account, but the second account's system crashes before the money is debited there. A recovery manager reconstructs the now recovering transaction and attempts to bring the system to a balanced and stable state according to the ACID properties of transactions. In any other application server the most you will be able to do is to try to reattempt recovery on all recovering transactions for n period of time and then give up and abandon them entirely. The solution provided here allows not only for a global default condition definition whereby recovery might be attempted every 10 minutes until successful, but for adjustments to these retry and abandonment cycles at a fine-grained level such that all recovering transactions of a particular application type or with participating resources of a certain type attempt recovery only every hour and abandon after 48 hours due to the nature of the failure, business process, or resources involved.

As shown in FIG. 4, with reference to FIG. 2, in step 402, runtime activities of transaction application 210, such as bank account transfer, recovery thereof, etc., occur. Likewise, in step 404, the transaction processing system 208 is configured with the rules that define fine-grained recovery behavior. For example, all recovering transactions of a particular application type or with participating resources of a certain type attempt may recovery only every hour and abandon after 48 hours.

In step 406, the transaction processing system 208 is updated. Updates can be provided by transaction manager 212, recovery manager 214, infrastructure 204, etc. Updates can include a stat increment, a configuration update, a transaction update, etc., and can be pushed to transaction processing system 208 or requested by transaction processing system 208.

In step 408, after a failure occurs and recovery is to begin, it is determined whether default recovery rules apply, or whether fine-grained recovery rules apply. If default recovery rules apply, then default recovery is performed and runtime activities 402 resume. If fine-grained rules apply, then in step 410, processing is performed according to the fine-grained rules, the current state of transaction processing system 208, and the current states of the transactions involved in the recovery. For example, if a particular application has been attempting to recover for 48 hours, abandonment is necessary according to the exemplary fine-grained rule definition. The system then proceeds to step 402, in which runtime activities are performed.

An example of Transactional Application 210, shown in FIG. 2, is shown in FIG. 5. In FIG. 5, it is assumed that the crash in the example shown in FIG. 4 was due to a fire, which caused the account's system to crash and melt the disc and that all information on the disk was utterly destroyed or the asset seized for some other reason.

The solution discussed here provides the ability to monitor these recovering transactions for information such as but not limited to:
  the state they are currently in
  the amount of time the recovery manager has been attempting to recover this particular transaction the name and identification of the transaction
information on all participants in the transaction Based on any combination of the above criteria, an administrator can be notified (e.g. by phone, email, rfid, etc.), for example, via the architecture described in the JMX specification, so that proper action may take place, or the action can be automated based on custom rules defined in subscribers to these events.

For example, the admin may wish to be notified immediately if a transaction related to a certain business process which failed and has been attempting to recover via rollback for 10 minutes and involves the database in city x.

The administrator can then choose to contact the DBA of the failing database, investigate the application server logs for any other possible issues, or designate that the recovery manager should try for 20 more minutes before abandoning the transaction. The above scenario could also be automated so that anytime this combination occurs an email with the server log should be sent to the DBA and the recovery manager should try for 20 more minutes before abandoning the transaction.

As shown in FIG. 5, with reference to FIG. 2, in step 502, one or more customer listeners are created. Customer listener are software objects that that filter events for a certain application type with particular participating resources, such as the database in city x, and in such a case transmits (such as by email) the server log to the database administrator and calls, for example, the JTA admin, to set the recovery reattempt for this transaction to be abandoned after 20 more minutes. All other apps remain at their custom value or the default value.

In step 504, event notifications are created. Event notifications contain information bout the application, its resources, etc. Event notifications are transmitted to subscribers for the event notifications and are typically transmitted periodically. For example, event notifications may be broadcast to subscribers at every hour of recovery.

In step 506, the created customer listeners are registered and activated, and the created event notifications are subscribed to. The listener/notification functionality is thus activated for use.

Meanwhile, in step 508, runtime activities of transaction application 210, such as bank account transfer, recovery thereof, etc., occur. In step 519, the transaction processing system 208 is updated. Updates can be provided by transaction manager 212, recovery manager 214, infrastructure 204, etc. Updates can include a stat increment, a configuration update, a transaction update, a recovery re-attempt, etc., and can be pushed to transaction processing system 208 or requested by transaction processing system 208.

In step 512, it is determined whether or not the update performed in step 510 has triggered an event. If it is determined that the update did not trigger an event, the process then proceeds to step 508, in which runtime activities are continued. If it is determined that the update did trigger an event, the process then proceeds to step 514, in which one or more custom listeners that were created in step 510 and registered in step 506 receive notification of the event that was broadcast. Each listener that received the event notification reacts according. The process then proceeds to step 508, in which runtime activities are continued.

Figure 6:
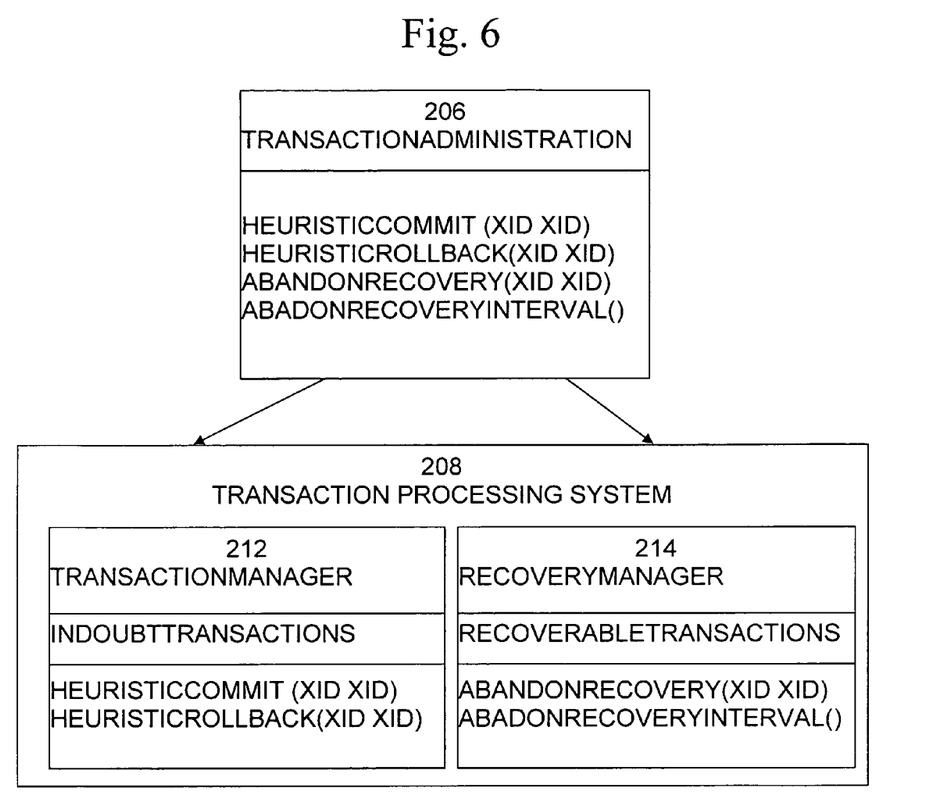
FIG. 6 is an exemplary block diagram of a Unified Modeling Language (UML) model of a transaction administration interface and transaction processing system.

An example of a Unified Modeling Language (UML) model of the transaction administration interface 206 and transaction processing system 208 which it calls upon is shown in FIG. 6. Transaction processing system 208 includes transaction manager 212, used during runtime processing and recovery manager 214, used during crash, etc. recovery.

Figure 7:
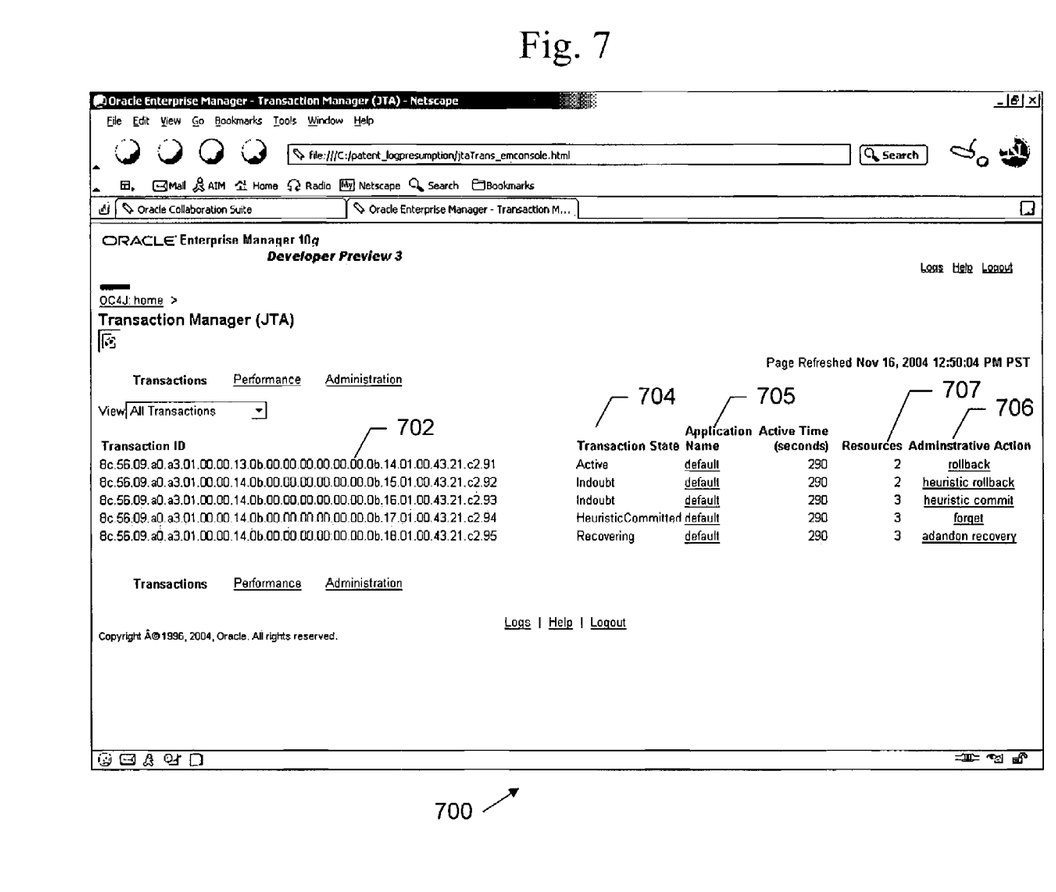
FIG. 7 is an exemplary display screen of an Administrative Client GUI console that ma be used by the present invention.

An exemplary display screen 700 of an Administrative Client GUI console is shown in FIG. 7. Screen 700 includes information such as transaction ID 702, transaction state 704, and administrative action 706. Transaction ID 702 provides an identification of each current transaction. Transaction state 704 provides an indication of the current state of each transaction, such as whether the transaction is active, in-doubt, recovering, committing, rolling back, etc. Application Name 705 provides an indication of the type of transaction, eg the business process involved. Resources 707 provides the number of resources that currently participate in this transaction and allows for a drilldown analysis of their detail. Administrative action 706 provides an indication of the administrative actions that the system has determined can be taken on each transaction. For example, administrative actions that may be taken may include rolling back the transaction, completing the transaction, abandoning recovery of the transaction, taking no administrative action on the transaction, etc.

Figure 8:
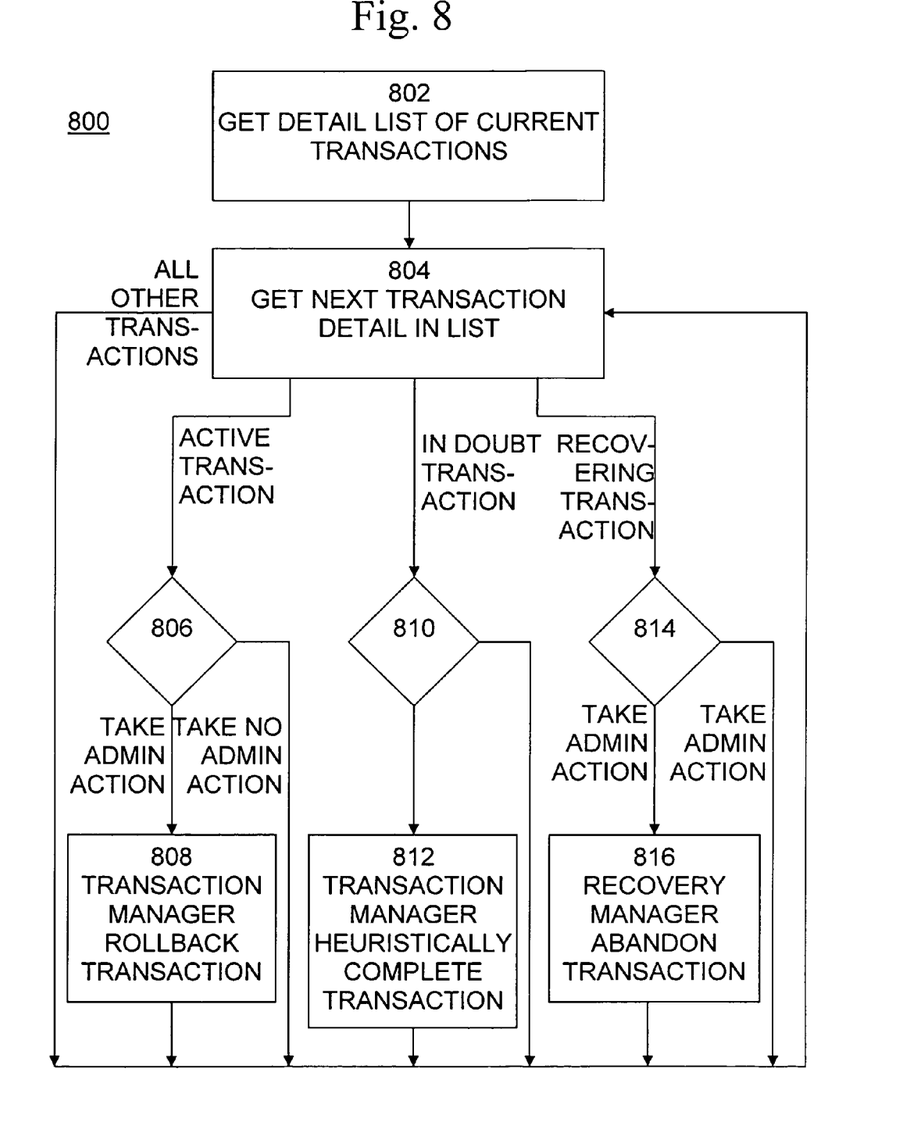
FIG. 8 is an exemplary flow diagram of a process of fine-grained administration of recovering transactions.

An example of a process 800 of fine-grained administration of recovering transactions is shown in FIG. 8. Process 800 begins with step 802, in which a detail list of current transactions, which are to be handled by process 800, is obtained. The detail list includes an identification of each transaction, an indication of the state of each transaction, such as whether the transaction is active, in-doubt, recovering, committing, rolling back, etc. In step 804, a loop is entered so that each transaction in the list may be handled. If the state of the transaction currently being handled is active, then the process continues with step 806, in which it is determined whether or not administrative action is to be taken. An active transaction is a transaction that has not yet entered the preparing phase of the commit process. For example, if the active transaction is determined to be taking too long to complete, relative to desired system response time or desired system resource allocation, then administrative action may be taken to intervene and terminate processing of the transaction. In this case, the process continues with step 808, in which the transaction manager terminates processing of the transaction, and rolls back the transaction, in order to restore the system state to the state that existed before processing of the transaction was started. If there is no reason to intervene in the active transaction, eg it is determined to not be taking too long to complete, then no administrative action is taken and the process loops back and continues with step 804, in which the next transaction in the list is handled.

If the state of the transaction currently being handled is in-doubt, then the process continues with step 810, in which it is determined whether or not administrative action is to be taken. An in-doubt transaction is a transaction which is in the preparing phase of the commit process, and which has not yet entered the commit phase. For example, if the in-doubt transaction is determined to be taking too long to complete, relative to desired system response time or desired system resource allocation, then administrative action may be taken to intervene in the processing of the transaction. Likewise, if it is determined that the in-doubt transaction is likely to fail, then administrative action may be taken. In this case, the process continues with step 812, in which the transaction manager heuristically completes the transaction. In step 812, the transaction manager forces the transaction to complete the preparation phase and to enter the commit phase. If the in-doubt transaction is determined to not be taking too long to complete or likely to fail, then no administrative action is taken and the process loops back and continues with step 804, in which the next transaction in the list is handled.

If the state of the transaction currently being handled is recovering, then the process continues with step 810, in which it is determined whether or not administrative action is to be taken. A recovering transaction is a transaction which has suffered an error or failure, and which the system is attempting to repair and complete. For example, if the recovering transaction is determined to be taking too long to recover, relative to desired system response time or desired system resource allocation, then administrative action may be taken to intervene in the processing of the transaction. Likewise, if it is determined that the recovering transaction is likely to fail, then administrative action may be taken. In this case, the process continues with step 812, in which the recovery manager terminates recovery of the transaction and abandons the transaction. If the recovering transaction is determined to not be taking too long to complete or likely to fail, then no administrative action is taken and the process loops back and continues with step 804, in which the next transaction in the list is handled.

If the transaction is of any other state, such as committing, rolling back, etc., then the transaction is not handled by process 800, and the process loops back and continues with step 804, in which the next transaction in the list is handled.

Figure 9:
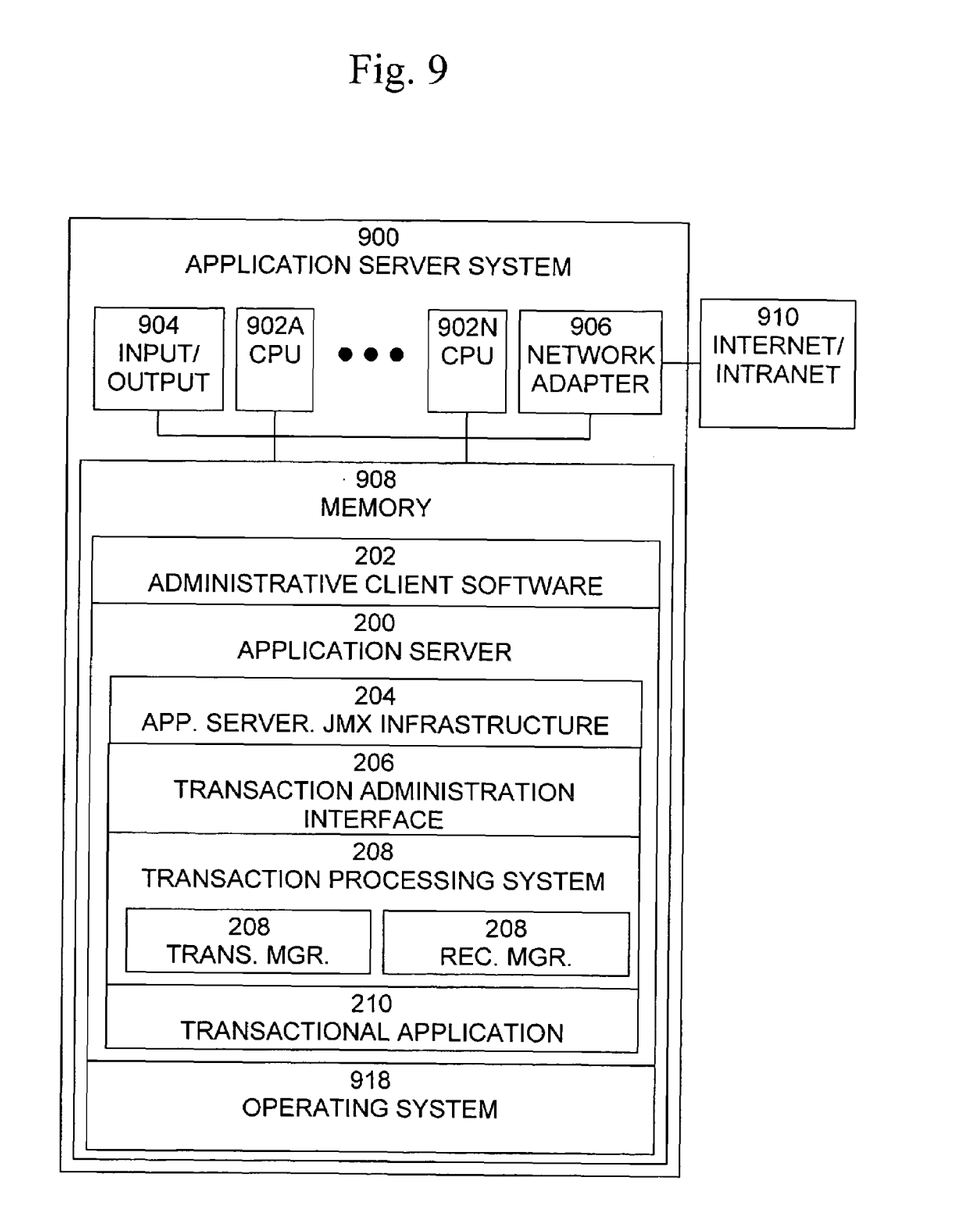
FIG. 9 is an exemplary block diagram of an application server system in which the present invention may be implemented.

An exemplary block diagram of an application server system 100, shown in FIG. 1, is shown in FIG. 9. System 100 is typically a programmed general-purpose computer system, such as a personal computer, workstation, server system, and minicomputer or mainframe computer. System 100 includes one or more processors (CPUs) 902A-902N, input/output circuitry 904, network adapter 906, and memory 908. CPUs 902A-902N execute program instructions in order to carry out the functions of the present invention. Typically, CPUs 902A-902N are one or more microprocessors, such as an INTEL PENTIUM® processor. FIG. 9 illustrates an embodiment in which system 100 is implemented as a single multi-processor computer system, in which multiple processors 902A-902N share system resources, such as memory 908, input/output circuitry 904, and network adapter 906. However, the present invention also contemplates embodiments in which system 100 is implemented as a plurality of networked computer systems, which may be single-processor computer systems, multi-processor computer systems, or a mix thereof.

Input/output circuitry 904 provides the capability to input data to, or output data from, system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 906 interfaces system 100 with Internet/intranet 910. Internet/intranet 910 may include one or more standard local area network (LAN) or wide area network (WAN), such as Ethernet, Token Ring, the Internet, or a private or proprietary LAN/WAN.

Memory 908 stores program instructions that are executed by, and data that are used and processed by, CPU 902 to perform the functions of system 100. Memory 908 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 908 vary depending upon the function that system 100 is programmed to perform. One of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 9, memory 908 includes administrative client software 202, application server 200, and operating system 918. Administrative client software 202 is the front-end that the user interacts with in order to monitor and manipulate transactions, and to register listeners for custom events. Application server 200 handles application operations between user applications and backend servers and are typically used for complex transaction-based applications. Application server 200 includes application server JMX infrastructure 204, transaction administration interface 206, transaction processing system 208, transactional application 210 Application Server JMX Infrastructure 204 is an example of an infrastructure used to handle interaction between administrative client software 202 and application server 200. Transaction administration interface 206 is the actual embodiment of the advanced fine-grained administration of the present invention. Interface 206 provides the capability to interact with transaction processing system 208 and to send custom events to listeners registered by administrative client 202. Transaction processing system 208 includes transaction manager 212, which is responsible for handling runtime processing of transactions. Transaction processing system 208 includes recovery manager 214, which is responsible for completing any transactions that may have been unexpectedly interrupted or failed (due to hardware crash or network failure, for example) thereby bringing the transactional participant resources to a stable state and maintaining the ACID properties of the transaction. Transactional application 210, also referred to as an application program, is the runtime routine (for example, a business process whereby funds are transferred from one bank to another) that requires the use of Transaction processing system 208 in order to maintain the ACID properties of the resources used within the scope of the transaction it has demarcated. Operating system 918 provides overall system functionality.

As shown in FIG. 9, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of administering recovering transactions in a transaction processing system, comprising the steps of:
    operating the transaction processing system; and
    in the transaction processing system, automatically attempting recovery of a plurality of transactions in the transaction processing system after a failure of the transaction processing system by determining a recovery action to be taken for each of the plurality of transactions individually, determining a state of each of the plurality of transactions individually, determining an administrative action to be taken with each of the plurality of transactions individually, based on the state of the transaction and on resources enlisted in the transaction, and displaying in a graphical user interface information relating to each of the plurality of transactions individually, including displaying the state of each of the plurality of transactions, a type of each of the plurality of transactions, information relating to resources participating in each of the plurality of transactions, and the administrative action that has been determined is to be taken for each of the plurality of transactions, wherein the step of determining an administrative action comprises the steps of:
    terminating and rolling back the transaction, if the state of the transaction is that the transaction has not yet entered the preparing phase of the commit process, and the resources exceed a limit;
    heuristically forcing the transaction to complete, if the state of the transaction is that the transaction is in the preparing phase of the commit process, and has not yet entered the commit phase, and the resources exceed a limit; and
    terminating recovery of the transaction and abandoning the transaction, if the state of the transaction is that the transaction has suffered an error or failure, and the system is attempting to repair and complete the transaction, and the resources exceed a limit.

2. The method of claim 1, wherein when the state of the transaction is that the transaction has not yet entered the preparing phase of the commit process, the limit includes the transaction taking longer to complete than a predefined response time, relative to desired system response time, or the transaction using resources greater than a predefined system resource allocation.

3. The method of claim 1, wherein when the state of the transaction is that the transaction is in the preparing phase of the commit process, the limit includes the transaction taking longer to complete than a predefined response time, relative to desired system response time, or the transaction using resources greater than a predefined system resource allocation.

4. The method of claim 1, wherein when the state of the transaction is that the transaction has suffered an error or failure, the limit includes the transaction taking longer to recover than a predefined response time, relative to desired system response time, or the transaction using resources greater than a predefined system resource allocation.

5. A system for administering recovering transactions comprising:
    a processor operable to execute computer program instructions;
    a memory operable to store computer program instructions executable by the processor; and
    computer program instructions stored in the memory and executable to perform the steps of:
    operating a transaction processing system; and
    attempting recovery of a plurality of transactions in the transaction processing system after a failure of the transaction processing system by determining a recovery action to be taken for each of the plurality of transactions individually, determining a state of each of the plurality of transactions individually, determining an administrative action to be taken with each of the plurality of transactions individually, based on the state of the transaction and on resources enlisted in the transaction, and displaying in a graphical user interface information relating to each of the plurality of transactions individually, including displaying the state of each of the plurality of transactions, a type of each of the plurality of transactions, information relating to resources participating in each of the plurality of transactions, and the administrative action that has been determined is to be taken for each of the plurality of transactions, wherein the step of determining an administrative action comprises the steps of:
    terminating and rolling back the transaction, if the state of the transaction is that the transaction has not yet entered the preparing phase of the commit process, and the resources exceed a limit;
    heuristically forcing the transaction to complete, if the state of the transaction is that the transaction is in the preparing phase of the commit process, and has not yet entered the commit phase, and the resources exceed a limit; and
    terminating recovery of the transaction and abandoning the transaction, if the state of the transaction is that the transaction has suffered an error or failure, and the system is attempting to repair and complete the transaction, and the resources exceed a limit.

6. The system of claim 5, wherein when the state of the transaction is that the transaction has not yet entered the preparing phase of the commit process, the limit includes the transaction taking longer to complete than a predefined response time, relative to desired system response time, or the transaction using resources greater than a predefined system resource allocation.

7. The system of claim 5, wherein when the state of the transaction is that the transaction is in the preparing phase of the commit process, the limit includes the transaction taking longer to complete than a predefined response time, relative to desired system response time, or the transaction using resources greater than a predefined system resource allocation.

8. The system of claim 5, wherein when the state of the transaction is that the transaction has suffered an error or failure, the limit includes the transaction taking longer to recover than a predefined response time, relative to desired system response time, or the transaction using resources greater than a predefined system resource allocation.

9. A computer program product for administering recovering transactions comprising:
a computer readable storage medium;
computer program instructions, recorded on the computer readable storage medium, executable by a processor, for performing the steps of
operating a transaction processing system; and
attempting recovery of a plurality of transactions in the transaction processing system after a failure of the transaction processing system by determining a recovery action to be taken for each of the plurality of transactions individually, determining a state of each of the plurality of transactions individually, determining an administrative action to be taken with each of the plurality of transactions individually, based on the state of the transaction and on resources enlisted in the transaction, and displaying in a graphical user interface information relating to each of the plurality of transactions individually, including displaying the state of each of the plurality of transactions, a type of each of the plurality of transactions, information relating to resources participating in each of the plurality of transactions, and the administrative action that has been determined is to be taken for each of the plurality of transactions, wherein the step of determining an administrative action comprises the steps of:
terminating and rolling back the transaction, if the state of the transaction is that the transaction has not yet entered the preparing phase of the commit process, and the resources exceed a limit;
heuristically forcing the transaction to complete, if the state of the transaction is that the transaction is in the preparing phase of the commit process, and has not yet entered the commit phase, and the resources exceed a limit; and
terminating recovery of the transaction and abandoning the transaction, if the state of the transaction is that the transaction has suffered an error or failure, and the system is attempting to repair and complete the transaction, and the resources exceed a limit.

10. The computer program product of claim 9, wherein when the state of the transaction is that the transaction has not yet entered the preparing phase of the commit process, the limit includes the transaction taking longer to complete than a predefined response time, relative to desired system response time, or the transaction using resources greater than a predefined system resource allocation.

11. The computer program product of claim 9, wherein when the state of the transaction is that the transaction is in the preparing phase of the commit process, the limit includes the transaction taking longer to complete than a predefined response time, relative to desired system response time, or the transaction using resources greater than a predefined system resource allocation.

12. The computer program product of claim 9, wherein when the state of the transaction is that the transaction has suffered an error or failure, the limit includes the transaction taking longer to recover than a predefined response time, relative to desired system response time, or the transaction using resources greater than a predefined system resource allocation.

13. A transaction processing system comprising:
a processor operable to execute computer program instructions;
a memory operable to store computer program instructions executable by the processor; and
computer program instructions stored in the memory and executable to implement:
a transaction manager operable to perform transaction processing; and
a recovery manager operable to attempt recovery of a plurality of transactions in the transaction processing system after a failure of the transaction processing system by determining a recovery action to be taken for each of the plurality of transactions individually, determining a state of each of the plurality of transactions individually, determining an administrative action to be taken with each of the plurality of transactions individually, based on the state of the transaction and on resources enlisted in the transaction, and displaying in a graphical user interface information relating to each of the plurality of transactions individually, including displaying the state of each of the plurality of transactions, the displayed information further comprises a type of each of the plurality of transactions, information relating to resources participating in each of the plurality of transactions, and the administrative action that has been determined is to be taken for each of the plurality of transactions, wherein the step of determining an administrative action comprises the steps of:
terminating and rolling back the transaction, if the state of the transaction is that the transaction has not yet entered the preparing phase of the commit process, and the resources exceed a limit;
heuristically forcing the transaction to complete, if the state of the transaction is that the transaction is in the preparing phase of the commit process, and has not yet entered the commit phase, and the resources exceed a limit; and
terminating recovery of the transaction and abandoning the transaction, if the state of the transaction is that the transaction has suffered an error or failure, and the system is attempting to repair and complete the transaction, and the resources exceed a limit.

14. The system of claim 13, wherein when the state of the transaction is that the transaction has not yet entered the preparing phase of the commit process, the limit includes the transaction taking longer to complete than a predefined response time, relative to desired system response time, or the transaction using resources greater than a predefined system resource allocation.

15. The system of claim 13, wherein, when the state of the transaction is that the transaction is in the preparing phase of the commit process, the limit includes the transaction taking longer to complete than a predefined response time, relative to desired system response time, or the transaction using resources greater than a predefined system resource allocation.

16. The system of claim 13, wherein when the state of the transaction is that the transaction has suffered an error or failure, the limit includes the transaction taking longer to recover than a predefined response time, relative to desired system response time, or the transaction using resources greater than a predefined system resource allocation.

* * * * *

UNITED STATES PATENT AND TRADEMARK OFFICE
CERTIFICATE OF CORRECTION

PATENT NO. : 7,698,309 B2
APPLICATION NO. : 11/204151
DATED : April 13, 2010
INVENTOR(S) : Paul Parkinson Page 1 of 1

It is certified that error appears in the above-identified patent and that said Letters Patent is hereby corrected as shown below:

In column 12, line 4, in Claim 3, delete "claim 1 ,wherein" and insert -- claim 1, wherein --, therefor.

In column 14, line 34, in Claim 13, after "not" delete "vet" and insert -- yet --, therefor.

Signed and Sealed this
First Day of March, 2011

David J. Kappos
*Director of the United States Patent and Trademark Office*